United States Patent [19]
Johnson

[11] Patent Number: 5,584,141
[45] Date of Patent: Dec. 17, 1996

[54] CARRIAGE APPARATUS FOR GROWING PLANTS

[76] Inventor: Neil W. Johnson, 3502 Rockcrest, Garland, Tex. 75044

[21] Appl. No.: 741,633

[22] Filed: Aug. 7, 1991

[51] Int. Cl.⁶ .................................................. A01G 31/02
[52] U.S. Cl. ...................................................... 47/65; 47/39
[58] Field of Search .................................. 47/65, 79, 17, 47/39; 472/46, 45, 6; 211/1.55

[56] References Cited

U.S. PATENT DOCUMENTS

| D. 223,677 | 5/1972 | Wienert . | |
|---|---|---|---|
| 900,820 | 10/1908 | Becker | 472/46 |
| 2,249,076 | 7/1941 | Courtney | 472/46 |
| 2,907,568 | 10/1959 | Velare et al. | 472/46 |
| 3,339,308 | 9/1967 | Clare . | |
| 3,529,379 | 9/1970 | Ware . | |
| 3,882,634 | 5/1975 | Dedolph | 47/65 D |
| 3,909,978 | 10/1975 | Fleming . | |
| 3,973,353 | 8/1976 | Dedolph | 47/65 D |
| 3,998,007 | 12/1976 | Martin . | |
| 4,085,544 | 3/1978 | Blake . | |
| 4,547,992 | 10/1985 | Wingerden . | |

*Primary Examiner*—Terry Lee Melius
*Assistant Examiner*—Joanne C. Downs
*Attorney, Agent, or Firm*—Daniel V. Thompson

[57] ABSTRACT

An apparatus for growing plants includes a frame, a main carriage rotatably mounted to the frame and a drive mechanism for causing rotation of the main carriage at a preselected rate. A plurality of satellite carriages are rotatably mounted to the main carriage. A synchronization mechanism causes the satellite carriages to rotate at a rate having a preselected ratio relative to the rotation rate of the main carriage. Retainers for plants are mounted to each of the satellite carriages.

14 Claims, 3 Drawing Sheets

CARRIAGE APPARATUS FOR GROWING PLANTS

TECHNICAL FIELD

This application is related to plant growing equipment, and more particularly to a carriage apparatus for greenhouses adapted for use in supporting and growing plants.

Background Art

Numerous devices have been disclosed in the past for supporting and growing plants in a greenhouse environment. The prior apparatus attempt to address the need to maximize the use of space within a greenhouse. One common technique is to provide moving plant carriers to equalize the light exposure provided to a number of plants.

For example, U.S. Pat. No. 3,909,978 to Fleming discloses a method and apparatus for growing plants wherein a chain driven apparatus rotates plant containers. U.S. Pat. No. 3,339,308 to Clare discloses an irrigating device wherein a large wheel carries single trays. U.S. Design Pat. No. 223,677 to Wienert discloses a rotatable planter having a single hub carrying trays at the ends of arms. U.S. Pat. No. 4,547,992 to Wingerden discloses apparatus for carrying plural plants to a watering station wherein hanging baskets are carried by a cable. U.S. Pat. No. 4,085,544 to Blake discloses a single-wheeled, plant supporting, moving and watering apparatus with the plant containers being carried by trays and supported by cantilever arms. U.S. Pat. No. 3,529,379 discloses a continuous chain-driven, plant growth apparatus with trays suspended by the chain.

None of these prior devices adequately utilizes all the space available in a greenhouse by efficient movement of plant containers. A need presently exists for a simple, inexpensive and easy to maintain device that permits maximum utilization of the sunlight and space available in a greenhouse environment.

SUMMARY OF THE INVENTION

The present invention addresses the drawbacks of the prior art greenhouse apparatus by providing a main carriage rotatably mounted to a frame. The main carriage is rotated at a preselected rate, with a plurality of satellite carriages rotatably mounted to the main carriage. The satellite carriages carry plant retainers and the satellite carriages rotate at a rate having a preselected ratio relative to the rotation rate of the main carriage.

BRIEF DESCRIPTION OF THE DRAWINGS

A more complete understanding of the invention and its advantages will be apparent from the Detailed Description taken in conjunction with the Drawings in which.

DETAILED DESCRIPTION OF THE PREFERRED EMBODIMENT

Figure 1:
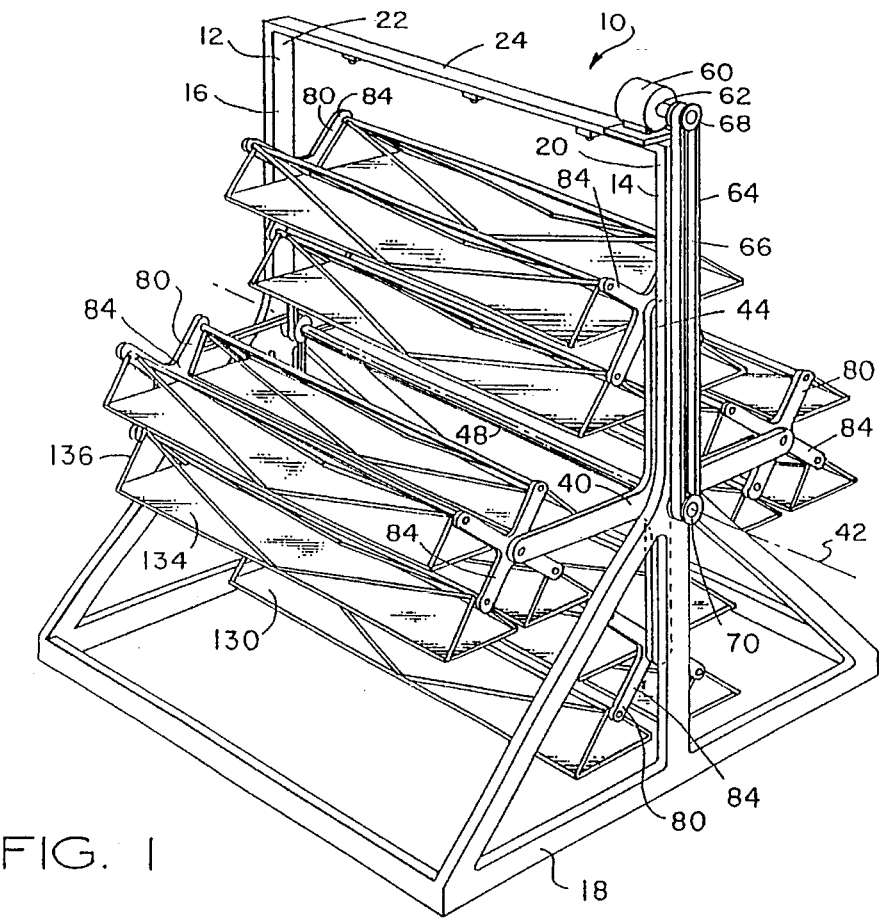
FIG. 1 is a perspective view of apparatus constructed in accordance with the invention.

Referring to FIGS. 1–4, where like numerals indicate like and corresponding elements, apparatus 10 includes a frame 12. Frame 12 has first and second opposed lateral frame members 14 and 16. Lateral frame members 14 and 16 extend upwardly from a base 18. Lateral frame members 14 and 16 are connected at top portions 20, 22 by top frame member 24. In the preferred embodiment, the frame members 14, 16, 18, 24 are metal stampings or extrusions. In addition, the frame members may include a plurality of adjustment holes to allow considerable size adjustments to the overall unit. The apparatus may thus be adapted to the space into which is to be employed or customized to maximize space in production capability, regardless of plant growth, species, or container type. An irrigation system incorporated into frame 12 includes an inlet 26 connected to outlets 28.

A main carriage 40 is rotatably mounted to the lateral frame members 14, 16 for rotation about a main axis 42. The main carriage 40 includes first and second, opposed, main carriage members 44, 46 connected by shaft 48 for corotation about the main axis 42. Each main carriage member 44, 46 is an X-shaped member having four main arms 50 (FIGS. 2 and 5) extending radially from a main hub portion 52. Main hub portion 52 of each main carriage member is connected to shaft 48, with the main arms 52 being spaced equally about the main hub portion 52. Thus, main arms 50 are spaced about 90 degrees apart about main hub portion 52. Main arms 50 on each main carriage number 44, 46 are registered with the main arms 50 on the other main carriage member.

Drive means 60 for causing rotation of the main carriage 40 is provided to rotate main carriage 40 at a preselected rotation rate. Drive means 60 includes an electric motor 62 fixed to top frame member 24. Drive means 60 further includes transmission means 64 for transmitting rotational forces to the main carriage member shaft 48. In the preferred embodiment, the transmission means includes a belt 66 and pulley 68 attached to electric motor 62 and pulley 70 attached to shaft 48. It will be readily appreciated by one skilled in the art that the preselected rotation rate is a factor of the rotation speed of motor 62 and the size ratio between pulleys 68, 70.

Figure 4:
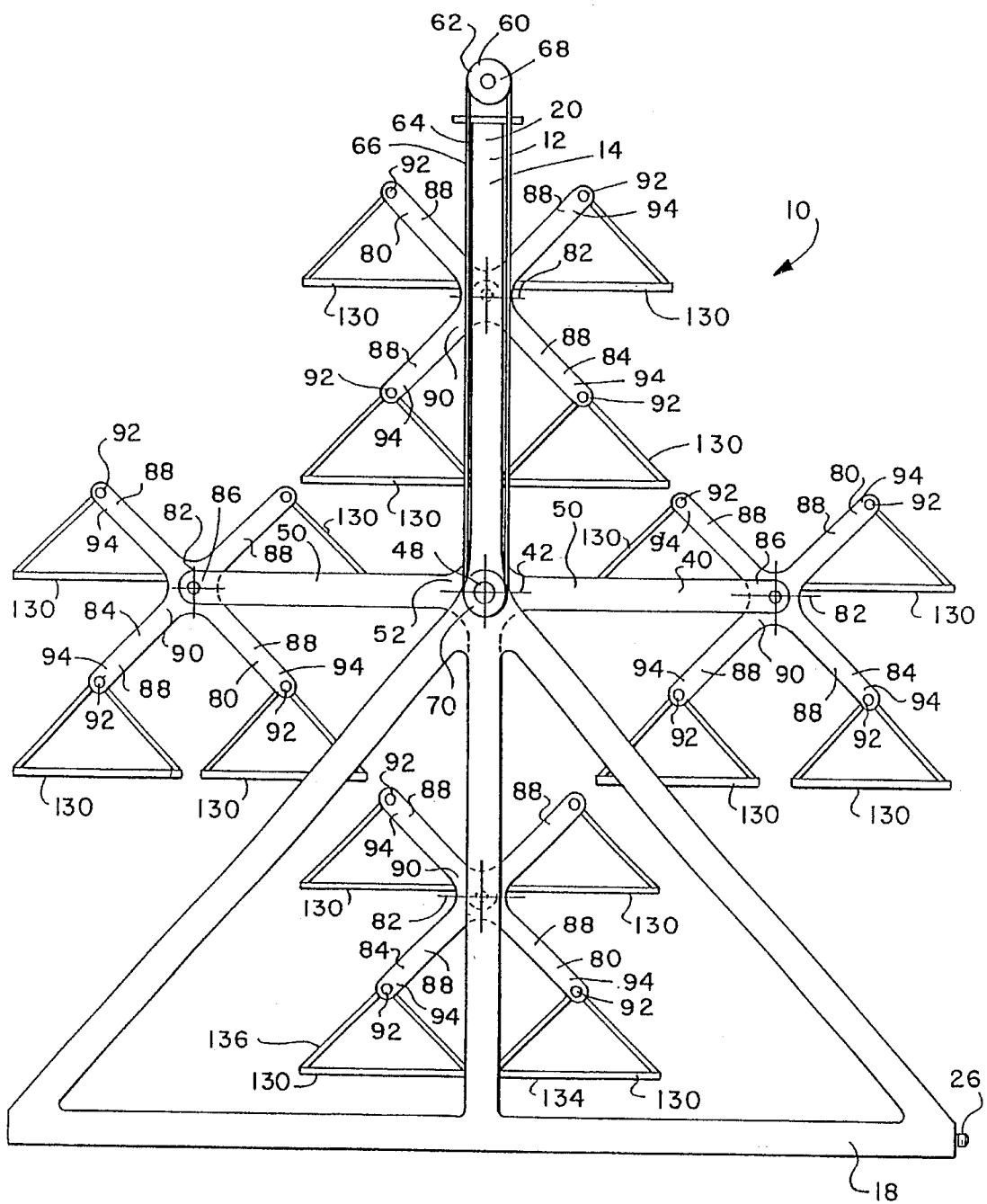
FIG. 4 is a side view similar to FIG. 2 but from the other side of the apparatus.

A plurality of satellite carriages 80 are rotatably mounted to main carriage 40 for rotation about satellite axes 82 parallel to the main axis 42. Each satellite carriage 80 includes a pair of opposed satellite carriage members 84 mounted to end portions 86 of opposing main arms 50. Each satellite carriage member 84 is an X-shaped member having four satellite arms 88 extending radially from a satellite hub portion 90 (FIG. 4). The hub portions 90 are rotatably connected to main arms 50 of main carriage members 44, 46. Satellite arms 88 are spaced equally about the satellite hub portions 90, i.e., at about 90 degrees, and the satellite arms 88 on each satellite carriage member 84 in a pair are registered with the satellite arms 88 on the other satellite carriage member 84 in the pair. Each pair of satellite carriage members 84 is maintained in registration by retainer shafts 92 extending between end portions 94 (FIG. 4) of opposing pairs of satellite arms 88.

Figure 2:
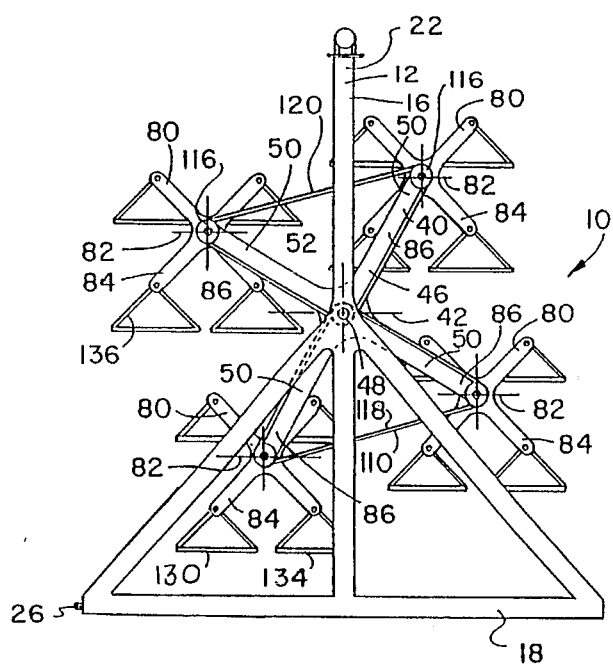
FIG. 2 is a side view of the apparatus in FIG. 1.
Figure 3:
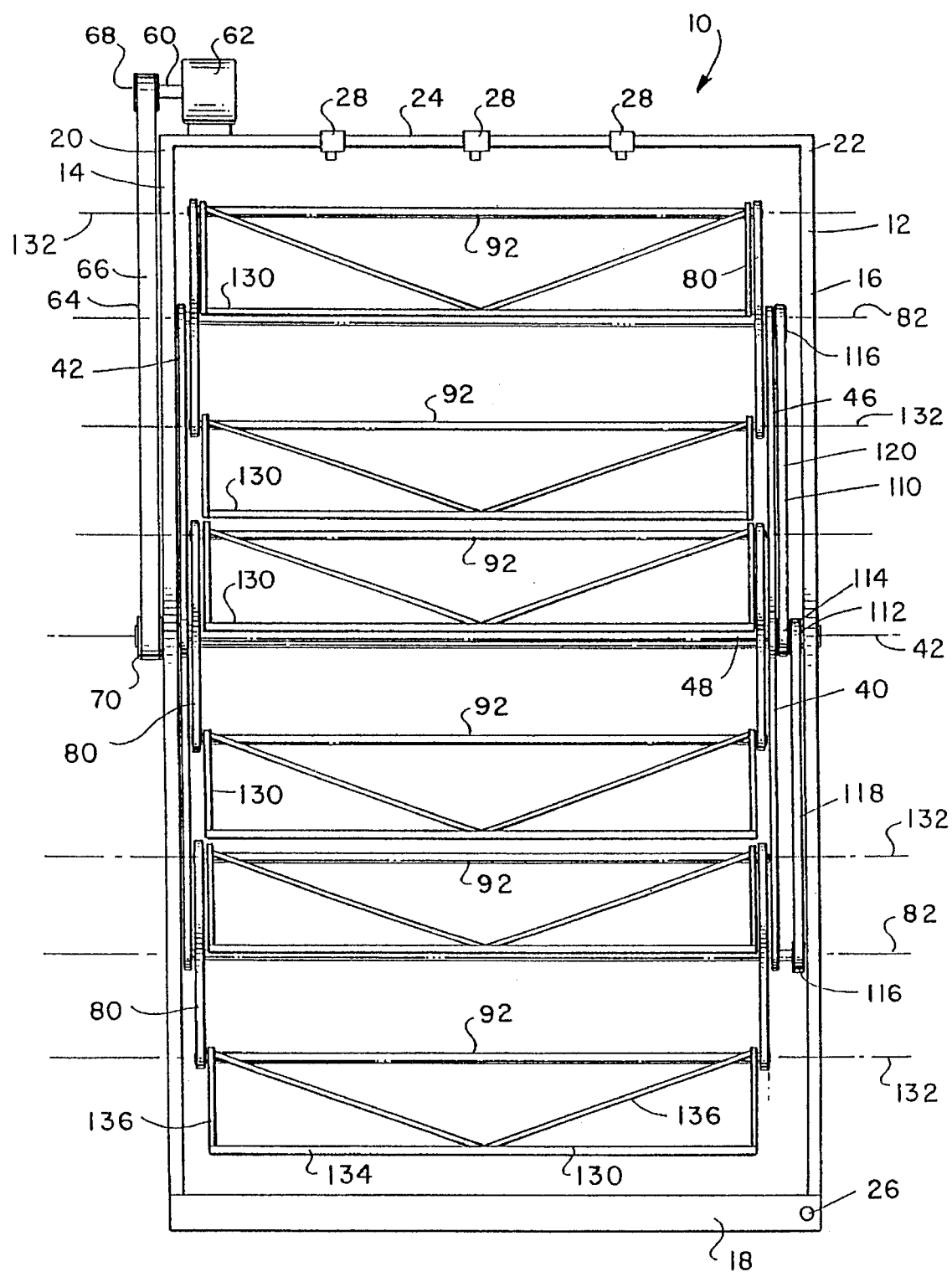
FIG. 3 is a front view.

Synchronization means 110 causes the satellite carriages 80 to rotate at a rate having a preselected ratio relative to the rotation rate of the main carriage 40 established by the electric motor 62 and transmission means 64. In the preferred embodiment, the synchronization means 110 includes first and second main pulleys 112, 114 (FIG. 3) attached to the main shaft 48 and first and second pairs of adjacent satellite pulleys 116 (FIGS. 2 and 3). One satellite pulley 116 is attached to one satellite member 84 of each pair of satellite members 84. A first belt 118 extends between first main pulley 112 and the first pair of adjacent satellite pulleys 116.

A second belt 120 extends between the second main pulley 114 and the second pair of adjacent satellite pulleys 116. Pulleys 112, 114, 116 are sized to cause the preselected ratio of rotation rates. Those skilled in the art will readily appreciate that an infinite number of ratios and rotation rates are possible by selection of appropriate pulley sizes and rotation speed of electric motor 62.

A plurality of plant retainers 130 are rotatably mounted to each of the satellite carriages 80 for rotation about retainer axes 132 (FIG. 3). Retainer axes 132 are parallel to the main axis 42 and are defined by retainer shafts 92. Each plant retainer 130 includes a planar tray 134 depending from the retainer shaft 92. Planar tray 134 is connected to the retainer shaft 92 by way of support rods 136, the support rods 136 being constructed and arranged such that the trays 134 are maintained in horizontal positions by gravity acting thereon as the apparatus rotates.

In operation, the apparatus is fitted with pulleys 112, 114, 116 sized to establish the preselected ratio of rotations between the main carriage and satellite carriages. It will be appreciated that differing species, sizes, and sunlight conditions will make particular rotations rates optimal for given environmental conditions. It is within the ordinary skill in the art and within range of reasonable experimentation to establish these pulley ranges and no attempt is made herein to dictate the particular optimal rotation ratios. The provision of an adjustable synchronization ratio enables the user to maximize the number of plants that can be grown in an existing greenhouse environment, as well as the type of container in which they are grown. The number of trays or hanging baskets which are capable of being supported by a single apparatus are thus greatly increased. While the preferred embodiment incorporates plaint retainers 130 as illustrated, the apparatus can also be fitted with direct planting trays or bars from which hanging baskets may be suspended without departing from the scope of the invention. It will also be appreciated that supplemental light can be provided utilizing the support of top frame member 24. In a typical configuration, 166.56 square feet of greenhouse floor space will support the production of 432 square feet of plant production, to a maximum height of 18 inches. Thus, it can be seen that the useable greenhouse floor space is increased by over 2 and one-half times. With smaller plants and/or different carriage configurations, increases of up to six times should be possible.

Whereas the present invention has been described with respect to a specific embodiment thereof, it will be understood that various changes and modifications will be suggested to one skilled in the art, and it is intended to encompass such changes and modifications as fall within the scope of the appended claims.

I claim:

1. Apparatus for maximizing the number of plants that can be grown in a greenhouse environment, comprising:

a frame;

a main carriage rotatably mounted to the frame for rotation about a main axis;

drive means for causing rotation of the main carriage at a preselected rate;

a plurality of satellite carriages rotatably mounted to the main carriage for rotation about satellite axes parallel to the main axis;

synchronization means for causing the satellite carriages to rotate at a rate having a preselected ration relative the rotation rate of the main carriage, the ratio being chosen for optimal plant growth of particular species and sizes of plants in available sunlight conditions of the greenhouse environment; and retainer means for retaining plants mounted to the each of the satellite carriages.

2. The apparatus of claim 1 with the frame having first and second, opposed, lateral frame members extending upwardly from a base and being connected at top portions thereof by a top frame member.

3. The apparatus of claim 2 with the main carriage rotatably mounted to the lateral frame members, the main carriage including first and second, opposed, main carriage members connected by a shaft for corotation about the main axis.

4. The apparatus of claim 3 with each main carriage member having a plurality of main arms extending radially from a main hub portion connected to the shaft, the main arms being spaced equally about the main hub portion, and the main arms on each main carriage member being registered with the main arms on the other main carriage member.

5. The apparatus of claim 4 with each main carriage member being an X-shaped member having four main arms extending radially from a main hub and spaced 90 degrees apart about the main hub.

6. The apparatus of claim 1 with the drive means including an electric motor fixed to the frame, and the drive means further including transmission means for transmitting rotational forces to a main carriage member shaft spanning between main carriage members along the main axis.

7. The apparatus of claim 6 where the motor is fixed to a top frame member.

8. The apparatus of claim 1 with each satellite carriage including a pair of opposed, satellite carriage members mounted to end portions of opposing main carriage member arms.

9. The apparatus of claim 8 with each satellite carriage member having a plurality of satellite arms extending radially from a satellite hub portion connected to the main carriage member arm end portion, the satellite arms being spaced equally about the satellite hub portion, and the satellite arms on each satellite carriage member being registered with the satellite arms on the other satellite carriage member.

10. The apparatus of claim 9 with each satellite carriage member being an X-shaped member having four satellite arms, the satellite arms being spaced 90 degrees apart about the satellite hub portion, and the satellite arms on each satellite carriage member in a pair being registered with the satellite arms on the other satellite carriage member in the pair, the pair being maintained in registration by retainer shafts extending between end portions of opposing pairs of satellite arms.

11. The apparatus of claim 1 with the synchronization means including at least one main pulley attached to the main carriage and satellite pulleys, one satellite pulley attached to each of the satellite carriages, with the pulleys being interconnected by at least one belt extending between the main pulley and satellite pulleys, the pulleys being dimensioned to cause the preselected ratio of rotation rates.

12. The apparatus of claim 1 where the retainer means includes a plurality of plant retainers rotatably mounted to each of the satellite carriages for rotation about retainer axes parallel to the main axis.

13. The apparatus of claim 12 with each of the plant retainers including a planar tray depending from a retainer shaft, the retainer shafts extending between end portions of satellite carriage member arms along the retainer axes, each tray connected to its associated retainer shaft by way of support rods, the support rods being constructed and arranged such that the trays are maintained in horizontal positions by gravity acting thereon.

14. Apparatus for maximizing the number of plants that can be grown in a greenhouse environment, comprising:

a frame having first and second, opposed, lateral frame members extending upwardly from a base and being connected at top portions thereof by a top frame member;

a main carriage rotatably mounted to the lateral frame members for rotation about a main axis, the main carriage including first and second, opposed, main carriage members connected by a shaft for corotation about the main axis;

each main carriage member being an X-shaped member having four main arms extending radially from a main hub portion connected to the shaft, the main arms being spaced equally about the main hub portion, and the main arms on each main carriage member being registered with the main arms on the other main carriage member;

drive means for causing rotation of the main carriage at a preselected rotation rate, the drive means including an electric motor fixed to the top frame member, and the drive means further including transmission means for transmitting rotational forces to the main carriage member shaft;

a plurality of satellite carriages rotatably mounted to the main carriage for rotation about satellite axes parallel to the main axis, each satellite carriage including a pair of opposed, satellite carriage members mounted to end portions of opposing main arms;

each satellite carriage member being an X-shaped member having four satellite arms extending radially from a satellite hub portion rotatably connected to a main arm of a main carriage member, the satellite arms being spaced equally about the satellite hub portion, and the satellite arms on each satellite carriage member in a pair being registered with the satellite arms on the other satellite carriage member in the pair, the pair being maintained in registration by retainer shafts extending between end portions of opposing pairs of satellite arms;

synchronization means for causing the satellite carriages to rotate at a rate having a preselected ratio relative the rotation rate of the main carriage established by the electric motor and transmission means, the synchronization means including first and second main pulleys attached to the main shaft and first and second pairs of adjacent satellite pulleys, one satellite pulley attached to one satellite member of each pair of satellite members, with a first belt extending between the first main pulley and the first pair of adjacent satellite pulleys and a second belt extending between the second main pulley and the second pair of adjacent satellite pulleys, the pulleys being dimensioned to case the preselected ratio of rotation rates, the ratio being chosen for optimal plant growth of particular species and sizes of plants in available sunlight conditions of the greenhouse environment; and a plurality of plant retainers rotatably mounted to each of the satellite carriages for rotation about retainer axes parallel to the main axis defined by the retainer shafts, each of the plant retainers including a planar tray depending from the retainer shaft and connected by to the retainer shaft by way of support rods, the support rods being constructed and arranged such that the trays are maintained in horizontal positions by gravity acting thereon.

* * * * *